(12) United States Patent
Kim et al.

(10) Patent No.: US 8,999,041 B2
(45) Date of Patent: Apr. 7, 2015

(54) CARBON DIOXIDE ISOLATING DEVICE AND METHOD

(75) Inventors: Jong Nam Kim, Daejeon (KR); Kwang Bok Yi, Daejeon (KR); Chang Hyun Ko, Daejeon (KR); Jong Ho Park, Daejeon (KR); Jeong Geol Na, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 355 days.

(21) Appl. No.: 13/503,093

(22) PCT Filed: May 25, 2010

(86) PCT No.: PCT/KR2010/003277
§ 371 (c)(1),
(2), (4) Date: Apr. 24, 2012

(87) PCT Pub. No.: WO2011/049281
PCT Pub. Date: Apr. 28, 2011

(65) Prior Publication Data
US 2012/0240764 A1 Sep. 27, 2012

(30) Foreign Application Priority Data
Oct. 21, 2009 (KR) .......................... 10-2009-0100183

(51) Int. Cl.
*B01D 53/14* (2006.01)
*B01D 53/62* (2006.01)
(52) U.S. Cl.
CPC ............ *B01D 53/1425* (2013.01); *B01D 53/62* (2013.01); *B01D 2257/504* (2013.01); *Y02C 10/04* (2013.01); *Y02C 10/06* (2013.01)

(58) Field of Classification Search
CPC ................... B01D 15/00; B01D 57/00–57/02; B01D 53/14–53/1493; B01D 2256/22; B01D 2257/504; B01D 59/28–59/30; B01D 61/00–61/58
USPC .............. 204/632, 536, 542, 533, 402; 95/51, 95/149–240; 210/670, 683
See application file for complete search history.

(56) References Cited

U.S. PATENT DOCUMENTS 3,554,691 A * 1/1971 Kuo et al. ........................ 23/229
4,615,780 A * 10/1986 Walker ........................... 204/538
(Continued)

FOREIGN PATENT DOCUMENTS

JP 2004-174369 A 6/2004
JP 2005-262051 A 9/2005
(Continued)

OTHER PUBLICATIONS

Stern, Michael C. "Electrochemically-mediated amine regeneration for carbon dioxide separation." PhD Thesis for the Massachusetts Institute of Technology. Feb. 2014.*
(Continued)

*Primary Examiner* — Duane Smith
*Assistant Examiner* — Stephen Hobson
(74) *Attorney, Agent, or Firm* — LRK Patent Law Firm (57) ABSTRACT

An apparatus for separating carbon dioxide is provided. The apparatus includes: an absorption column in which carbon dioxide in off-gas is allowed to react with an absorbent solution so as to strip the carbon dioxide from the off-gas; a regeneration column in which the carbon dioxide is removed from the absorbent solution to regenerate the absorbent solution; and an ion-exchange column including a chamber having a cathode chamber space that receives the absorbent solution from the absorption column and an anode chamber space that receives the absorbent solution from the regeneration column, the ion-exchange column further including a permeable membrane that divides the chamber into the cathode chamber space and the anode chamber space.

33 Claims, 4 Drawing Sheets

(56) References Cited

U.S. PATENT DOCUMENTS

| | | | | |
|---|---|---|---|---|
| 4,636,289 A | * | 1/1987 | Mani et al. | 204/534 |
| 4,643,886 A | * | 2/1987 | Chang et al. | 423/226 |
| 4,874,485 A | * | 10/1989 | Steele | 205/688 |
| 4,936,970 A | * | 6/1990 | Weinberg et al. | 204/242 |
| 5,281,317 A | * | 1/1994 | Mani et al. | 95/186 |
| 5,292,407 A | * | 3/1994 | Roy et al. | 205/431 |
| 5,320,816 A | * | 6/1994 | Tsai et al. | 423/235 |
| 5,910,611 A | * | 6/1999 | Gregory et al. | 564/497 |
| 5,968,337 A | * | 10/1999 | Surma et al. | 205/688 |
| 6,527,932 B1 | * | 3/2003 | Botzem et al. | 204/534 |
| 7,232,782 B2 | | 6/2007 | Hammel et al. | 502/22 |
| 7,604,724 B2 | * | 10/2009 | Mortson | 204/522 |
| 7,637,984 B2 | * | 12/2009 | Adamopoulos | 95/45 |
| 7,947,239 B2 | | 5/2011 | Lackner et al. | 423/220 |
| 8,137,444 B2 | * | 3/2012 | Farsad et al. | 96/235 |
| 8,298,319 B2 | * | 10/2012 | Cho et al. | 95/96 |
| 8,328,911 B2 | * | 12/2012 | Liu et al. | 95/183 |
| 8,529,855 B2 | * | 9/2013 | Chew | 423/220 |
| 8,535,502 B2 | * | 9/2013 | Littau et al. | 204/528 |
| 8,715,393 B2 | * | 5/2014 | Wright et al. | 95/139 |
| 2009/0035199 A1 | * | 2/2009 | Mortson | 423/224 |
| 2009/0232861 A1 | * | 9/2009 | Wright et al. | 424/405 |
| 2010/0236242 A1 | * | 9/2010 | Farsad et al. | 60/685 |
| 2010/0313758 A1 | * | 12/2010 | Stevens et al. | 96/10 |
| 2011/0083968 A1 | * | 4/2011 | Gilliam et al. | 205/555 |
| 2013/0058857 A1 | * | 3/2013 | Stern et al. | 423/415.1 |
| 2013/0059365 A1 | * | 3/2013 | Henderson et al. | 435/266 |
| 2013/0177489 A1 | * | 7/2013 | Dube | 423/220 |
| 2013/0336722 A1 | * | 12/2013 | Wright et al. | 405/129.35 |
| 2014/0027285 A1 | * | 1/2014 | Parisi | 204/541 |
| 2014/0151240 A1 | * | 6/2014 | Bedell et al. | 205/455 |

FOREIGN PATENT DOCUMENTS

| | | | |
|---|---|---|---|
| JP | 2005-270814 A | | 10/2005 |
| KR | 10-2005-0017649 | * | 2/2005 |
| KR | 10-0557790 B1 | | 3/2006 |
| KR | 10-0707191 B1 | | 4/2007 |
| KR | 10-0918883 B1 | | 9/2009 |
| WO | WO 0142143 A2 | * | 6/2001 |

OTHER PUBLICATIONS

Huang et al. "Method to regenerate ammonia for the capture of carbon dioxide" Energy & Fuels, 16, 904-910 published 2002.*
KR 20050017649 as translated by Pheonix Translations.*
International Search Report for International Application No. PCT/KR2010/003277, published Apr. 28, 2011.

* cited by examiner

CARBON DIOXIDE ISOLATING DEVICE AND METHOD

CROSS REFERENCE TO RELATED APPLICATION

This application is a National Stage of International Application No. PCT/KR2010/003277 filed May 25, 2010, claiming priority based on Korean Patent Application No. 10-2009-0100183 filed Oct. 21, 2009, the content of which is incorporated herein by reference in its entirety.

TECHNICAL FIELD

The present invention relates to an apparatus and method for separating carbon dioxide, and more particularly to an apparatus and method for separating carbon dioxide, in which the efficiency of absorption of carbon dioxide by an absorbent solution and the efficiency of regeneration of the absorbent solution are increased.

BACKGROUND ART

Recently, studies on technologies of efficiently capturing, transporting and storing carbon dioxide from off-gas streams in order to reduce greenhouse gas emissions have been actively conducted. At present, absorption processes that use wet absorbents are being widely used to separate and remove carbon dioxide from off-gas streams. In general absorption processes, absorbents such as amine-based compounds are used to absorb and separate carbon dioxide from off-gas streams. However, this absorption process has a disadvantage in that the amine-based compounds are expensive, and thus the costs of designing and operating an apparatus for separating carbon dioxide increase. In addition, the absorption process has problems in that the consumption of energy for regeneration of the absorbent is high and an apparatus for treating off-gas is corroded by the amine-based compound.

DISCLOSURE

Technical Problem

It is an object of the present invention to provide an apparatus for separating carbon dioxide, in which the efficiency of separation of carbon dioxide is increased.

Another object of the present invention is to provide an apparatus for separating carbon dioxide, in which the efficiency of regeneration of an absorbent solution which strips carbon dioxide from off-gas is increased.

Still another object of the present invention is to provide an apparatus for separating carbon dioxide, in which the energy for regeneration of an absorbent solution is reduced.

Still another object of the present invention is to provide a method for separating carbon dioxide, in which the efficiency of separation of carbon dioxide is increased.

Yet object of the present invention is to provide a method apparatus for separating carbon dioxide, in which the efficiency of regeneration of an absorbent solution which strips carbon dioxide from off-gas is increased.

Yet another object of the present invention is to provide a method for separating carbon dioxide, in which the energy for regeneration of an absorbent solution is reduced.

Technical Solution

In accordance with an embodiment of the present invention, there is provided an apparatus for separating carbon dioxide, the apparatus comprising: an absorption column in which carbon dioxide in off-gas is allowed to react with an absorbent solution so as to strip the carbon dioxide from the off-gas; a regeneration column in which the carbon dioxide is removed from the absorbent solution to regenerate the absorbent solution; and an ion-exchange column comprising a chamber having a cathode chamber space that receives the absorbent solution from the absorption column and an anode chamber space that receives the absorbent solution from the regeneration column, the ion-exchange column comprising a permeable membrane that divides the chamber into the cathode chamber space and the anode chamber space.

According to an embodiment of the present invention, the ion-exchange column may further comprise: a cathode plate disposed in the cathode chamber space; and an anode plate disposed in the anode chamber space so as to face the cathode plate.

According to an embodiment of the present invention, the cathode plate and the anode plate may be provided such that the following cathodic reactions and anodic reactions occur on the cathode and anode plates, respectively:

[cathodic reactions]

$$H_2O \rightarrow \tfrac{1}{2}H_2\uparrow + OH^-; \text{ and}$$

$$NH_4^+ \rightarrow NH_3\uparrow + H^+;$$

[anodic reactions]

$$H_2O \rightarrow \tfrac{1}{2}O_2\uparrow + 2H^+;$$

$$CO_3^{2-} + H^+ \rightarrow HCO_3^-; \text{ and}$$

$$HCO_3^- + H^+ \rightarrow H_2CO_3^{2-} \rightarrow H_2O + CO_2\uparrow.$$

According to an embodiment of the present invention, the permeable membrane may comprise at least one of a bipolar membrane (a composite of an anion-permeable membrane and a cation-permeable membrane), an anion-permeable membrane and a cation-permeable membrane.

According to an embodiment of the present invention, the apparatus may further comprise a gas discharge line for discharging a gas including oxygen ($O_2$) and carbon dioxide ($CO_2$) from the anode chamber space.

According to an embodiment of the present invention, the absorption column comprises a first absorbent solution recovery line which is connected to the chamber so as to pass the absorbent solution from the absorption column into the anode chamber space, and the regeneration column comprises a second absorbent solution recovery line which is connected to the chamber so as to pass the regeneration column into the cathode chamber space.

According to an embodiment of the present invention, the ion-exchange column may further comprise baffles which are disposed in the chamber so as to prevent gas from flowing into the first absorbent solution recovery line and the second absorbent solution recovery line.

According to an embodiment of the present invention, the apparatus may further comprise a gas scrubber which receives the absorbent solution and a gas from the ion-exchange column.

According to an embodiment of the present invention, the gas scrubber may comprise: a scrubber body; a third absorbent solution recovery line through which the absorbent solution is supplied from the scrubber body to the absorption column; and a gas discharge line through which a gas in the scrubber body is discharged to the outside.

According to an embodiment of the present invention, the ion-exchange column may further comprise: an absorbent solution supply line through which the absorbent solution is supplied from the chamber to the scrubber body; and a gas recovery line through which a gas is recovered from the chamber into the scrubber body.

According to an embodiment of the present invention, one end of the absorbent solution supply line may be connected to the bottom of the chamber, the other end of the absorbent solution supply line may be connected to the top of the scrubber body, one end of the gas recovery line may be connected to the top of the chamber, and the other end of the gas recovery line may be connected to the bottom of the scrubber body.

According to an embodiment of the present invention, there is provided a method for separating carbon dioxide, the method comprising the steps of: allowing carbon dioxide in an off-gas to react with an absorbent solution so as to strip the carbon dioxide from the off-gas; removing the carbon dioxide from the absorbent solution to regenerate the absorbent solution; introducing the absorbent solution into an anode chamber space; introducing the absorbent solution into a cathode chamber space divided from the anode chamber space by a permeable membrane; and ion-exchanging the first absorbent solution, introduced into the anode chamber space, with the second absorbent solution introduced into the cathode chamber space, by the permeable membrane.

According to an embodiment of the present invention, the step of ion-exchanging the first absorbent solution with the second absorbent solution may comprise at least one of a step of moving cations in the first absorbent solution to the cathode chamber space and a step of moving anions in the second absorbent solution to the anode chamber space.

According to an embodiment of the present invention, the step of ion-exchanging the first absorbent solution with the second absorbent solution may be carried out through at least one of a bipolar membrane, a cation-permeable membrane and an anion-permeable membrane, which are disposed between the cathode chamber space and the anode chamber space.

According to an embodiment of the present invention, the method may further comprise a step of discharging a gas containing oxygen ($O_2$) and carbon dioxide ($CO_2$) from the anode chamber space to the outside.

According to an embodiment of the present invention, the method may further comprise a step of scrubbing a gas of the cathode chamber space with the absorbent solution of the cathode chamber space in the outside of the cathode chamber space.

According to an embodiment of the present invention, the step of scrubbing the gas of the cathode chamber space with the absorbent solution of the cathode chamber space in the outside of the cathode chamber space may comprise the steps of: providing a gas scrubber; supplying the absorbent solution from the cathode chamber space to the upper portion of the gas scrubber; and supplying the gas from the cathode chamber space to the lower portion of the gas scrubber.

According to an embodiment of the present invention, the method may further comprise, after the step of scrubbing the gas of the cathode chamber space with the absorbent solution of the cathode chamber space in the outside of the cathode chamber space, a step of recovering the absorbent solution, from which the gas was scrubbed, into the absorption column.

According to an embodiment of the present invention, the method may further comprise, after the step of scrubbing the gas of the cathode chamber space with the absorbent solution of the cathode chamber in the outside of the cathode chamber, a step of discharging the gas to the outside of the gas scrubber.

According to an embodiment of the present invention, there is provided a method for separating carbon dioxide, the method comprising treating an off-gas in an absorption column in which carbon dioxide in the off-gas is allowed to react with an ammonia-containing absorbent solution so as to strip the carbon dioxide from the off-gas and in a regeneration column in which the carbon dioxide is removed from the absorbent solution to regenerate the absorbent solution, wherein cations in the absorbent solution discharged from the absorption column are ion-exchanged with anions of the absorbent solution discharged from the regeneration column, thereby reducing the concentration of carbon dioxide in the absorbent solution and increasing the concentration of ammonia in the absorbent solution.

According to an embodiment of the present invention, reducing the concentration of carbon dioxide in the absorbent solution may be performed by introducing the absorbent into an anode chamber space provided with an anode plate, and moving carbon dioxide of the absorbent solution in the anode chamber space through a permeable membrane to a cathode chamber space provided with a cathode plate.

According to an embodiment of the present invention, increasing the concentration of ammonia in the absorbent solution may be performed by introducing the absorbent solution into a cathode chamber space provided with a cathode plate, and moving ammonium ($NH_4^+$) of the absorbent solution in the cathode chamber space through a permeable membrane to an anode chamber space provided with an anode plate.

According to an embodiment of the present invention, the method may further comprise scrubbing a gas of the cathode chamber space with the absorbent solution of the cathode chamber space in the outside of the cathode chamber space.

According to an embodiment of the present invention, scrubbing the gas of the cathode chamber space with the absorbent solution of the cathode chamber space in the outside of the cathode chamber space may be performed by providing a gas scrubber, supplying the absorbent solution from the cathode chamber space to the top of the gas scrubber, supplying the gas from the cathode chamber space to the bottom of the gas scrubber, and recovering the absorbent, from which the gas was scrubbed, from the bottom of the gas scrubber into the absorption column.

According to an embodiment of the present invention, the gas comprises hydrogen and an absorbent active material, in which the absorbent active material is absorbed into the absorbent solution when scrubbing the gas of the cathode chamber space with the absorbent solution of the cathode chamber space in the outside of the cathode chamber.

According to an embodiment of the present invention, there is provided an apparatus for separating carbon dioxide, the apparatus comprising: a chamber having a cathode chamber space provided with a cathode plate and an anode chamber space provided with an anode plate; a permeable membrane disposed between the cathode plate and the anode plate so as to divide the chamber into the cathode chamber space and the anode chamber space; and a gas scrubber which receives a gas from the chamber and scrubs the gas.

According to an embodiment of the present invention, the gas may contain hydrogen and an absorbent active material.

According to an embodiment of the present invention, the gas scrubber may comprise: a scrubber body; a third absorbent solution recovery line through which an absorbent solution is supplied from the scrubber body to an absorption column; and a gas discharge line through which a gas in the scrubber body is discharged to the outside.

According to an embodiment of the present invention, the apparatus may further comprise: an absorbent solution supply line through which the absorbent solution is supplied from the chamber to the scrubber body; and a gas recovery line through which a gas is recovered from the chamber into the scrubber body.

According to an embodiment of the present invention, one end of the absorbent solution supply line is connected to the bottom of the chamber, the other end of the absorbent solution supply line is connected to the top of the scrubber body, one end of the gas recovery line is connected to the top of the chamber, and the other end of the gas recovery line is connected to the bottom of the scrubber body.

According to an embodiment of the present invention, the permeable membrane may comprise any one of an anion-permeable membrane and a cation-permeable membrane.

According to an embodiment of the present invention, the cathode plate and the anode plate may be provided such that the following cathodic reactions and anodic reactions occur on the cathode and anode plates, respectively:

[cathodic reactions]

$H_2O \rightarrow \frac{1}{2}H_2\uparrow + OH^-$; and $NH_4^+ \rightarrow NH_3\uparrow + H^+$;

[anodic reactions]

$H_2O \rightarrow \frac{1}{2}O_2\uparrow + 2H^+$;

$CO_3^{2-} + H^+ \rightarrow HCO_3^-$; and $HCO_3^- + H^+ \rightarrow H_2CO_3^{2-} \rightarrow H_2O + CO_2\uparrow$.

According to an embodiment of the present invention, the apparatus may further comprise a gas discharge line through which a gas containing oxygen ($O_2$) and carbon dioxide is discharged from the anode chamber space.

According to an embodiment of the present invention, the apparatus may further comprise baffles which are disposed in the chamber so as to prevent a gas from flowing into the first absorbent solution recovery line and the second absorbent solution recovery line.

Advantageous Effects

An apparatus for separating carbon dioxide according to the present invention may comprise an ion-exchange column in which cations in an absorbent solution received from an absorbent column is ion-exchanged with anions of an absorbent solution received from a regeneration column, through a permeable membrane, thereby increasing the carbon dioxide stripping efficiency of the absorbent solution and the efficiency of regeneration of the absorbent solution. Thus, the apparatus for separating carbon dioxide according to the present invention can increase the efficiency of stripping of carbon dioxide from off-gas and the efficiency of regeneration of the absorbent solution, thereby increasing the efficiency of separation of carbon dioxide.

In the apparatus for separating carbon dioxide according to the present invention, cations in an absorbent solution received from an absorbent column is ion-exchanged with anions of an absorbent solution received from a regeneration column, through a permeable membrane, thereby reducing the concentration of carbon dioxide in the absorbent solution and the concentration of an absorbent active material in the absorbent solution. Thus, the apparatus for separating carbon dioxide according to the present invention can reduce the energy required for regeneration of the absorbent solution to increase the efficiency of regeneration of the absorbent solution, and it can increase the carbon dioxide stripping efficiency of the absorbent solution to increase the efficiency of stripping of carbon dioxide from off-gas.

In a method for separating carbon dioxide according to the present invention, cations in an absorbent solution received from an absorbent column is ion-exchanged with anions of an absorbent solution received from a regeneration column, through a permeable membrane, thereby increasing the carbon dioxide stripping efficiency of the absorbent solution and the efficiency of regeneration of the absorbent solution. Thus, the method for separating carbon dioxide according to the present invention can increase the efficiency of stripping of carbon dioxide from off-gas and the efficiency of regeneration of the absorbent solution, thereby increasing the efficiency of separation of carbon dioxide.

In the method for separating carbon dioxide according to the present invention, cations in an absorbent solution received from an absorbent column is ion-exchanged with anions of an absorbent solution received from a regeneration column, through a permeable membrane, thereby reducing the concentration of carbon dioxide in the absorbent solution and the concentration of an absorbent active material in the absorbent solution. Thus, the method for separating carbon dioxide according to the present invention can reduce the energy required for regeneration of the absorbent solution to increase the efficiency of regeneration of the absorbent solution, and it can increase the carbon dioxide stripping efficiency of the absorbent solution to increase the efficiency of stripping of carbon dioxide from off-gas.

MODE FOR INVENTION

Advantages and characteristics of the present invention, and a method for achieving them will be apparent with reference to embodiments described below in addition to the accompanying drawings. However, the present invention is not limited to the embodiments disclosed below, but may be implemented in various forms. The embodiments may be provided to completely disclose the present invention and allow those skilled in the art to completely know the scope of the present invention. Throughout the specification, like elements refer to like reference numerals.

Terms used in the specification are used to explain the embodiments and not to limit the scope of the present invention. In the specification, a singular type may also be used as a plural type unless stated specifically. "Comprises" and/or "comprising" used herein does not exclude the existence or addition of one or more other components, steps, operations and/or elements.

Hereinafter, an apparatus and method for separating carbon dioxide according to embodiments of the present invention will be described in detail with reference to the accompanying drawings.

Figure 1:
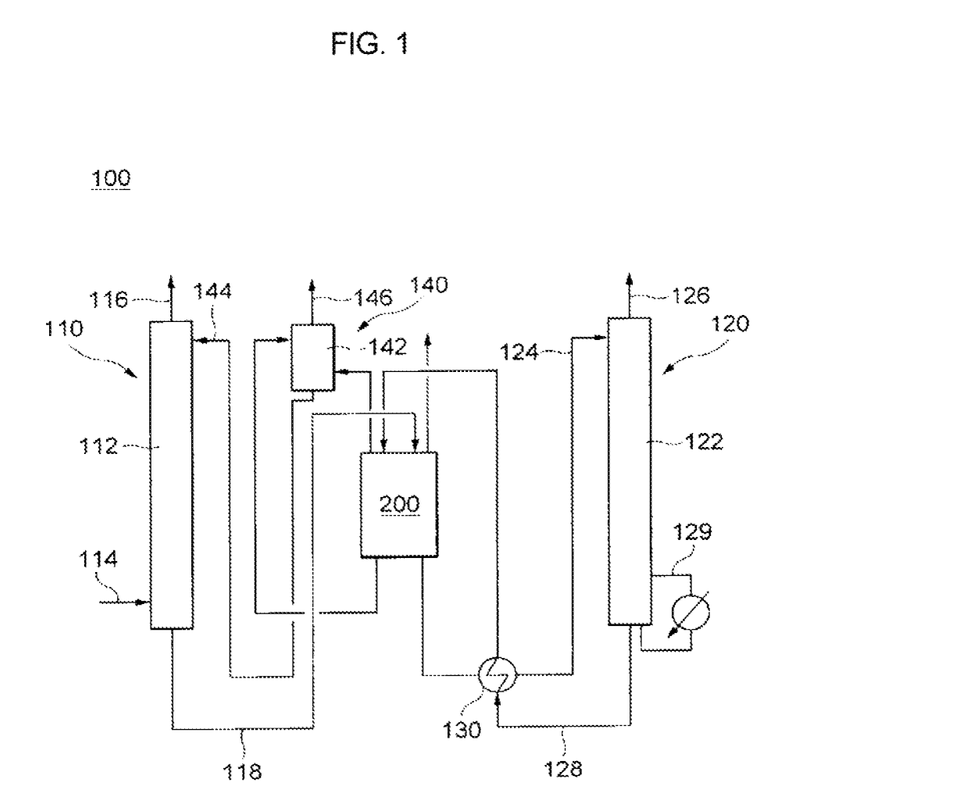
FIG. 1 shows an apparatus for separating carbon dioxide according to an embodiment of the present invention.

FIG. 1 shows an apparatus for separating carbon dioxide according to an embodiment of the present invention. Referring to FIG. 1, an apparatus 100 for separating carbon dioxide according to an embodiment of the present invention may comprise an absorption column 110, a regeneration column 120, a heat exchanger 130, a gas scrubber 140, and an ion-exchange column 200.

In the absorption column 110, carbon dioxide in off-gas received from the outside can be absorbed by a specific absorbent solution, whereby the carbon dioxide can be removed from the off-gas. The absorption column 110 may comprise an absorption column body 112, an off-gas introduction line 114, an off-gas discharge line 116, and a first absorbent solution recovery line 118. Off-gas can be introduced into the absorption column body 112 from the outside through the off-gas introduction line 114 connected to the bottom of the absorption column body 112. The off-gas discharge line 116 is connected to the top of the absorption column body 112 such that the off-gas treated in the absorption column body 112 can be discharged to the outside. In addition, one end of the first absorption solution recovery line 118 may be connected to the bottom of the absorption column body 112, and the other end may be connected to the top of the ion-exchange column 200. Thus, the first absorbent solution recovery line 118 can recover the carbon dioxide-absorbed absorbent solution from the absorption column body 112 to the ion-exchange column 200.

The regeneration column 120 can remove carbon dioxide from the absorbent solution to regenerate the absorbent solution. The regeneration column 120 may comprise a regeneration column body 122, an absorbent solution introduction line 124, a carbon dioxide discharge line 126, a second absorbent solution recovery line 128, and a reboiler 129. The absorbent solution from the ion-exchange column 200 can be introduced into the regeneration column body 122 through the absorbent solution introduction line 124 connected to the top of the regeneration column body 122. The absorbent solution introduction line 124 may be provided with the heat exchanger 130. The carbon dioxide discharge line 126 may be connected to the top of the regeneration column body 122 such that carbon dioxide in the regeneration column body 122 can be discharged to the outside. One end of the second absorbent solution recovery line 128 may be connected to the bottom of the regeneration column body 122, and the other end may be connected to the top of the ion-exchange column 200. In addition, the second absorbent solution recovery line 128 may be provided such that it passes through the heat exchanger 130 of the absorbent solution introduction line 124. Thus, the second absorbent solution recovery line can be provided such that the absorbent solution being recovered from the regeneration column body 122 to the ion-exchange column 200 is heat-exchanged with the absorbent solution flowing through absorbent solution introduction line 124 in the heat-exchanger 130. In addition, the reboiler 129 allows the absorbent solution, from which carbon dioxide was removed, to be circulated in the regeneration column body 122, and enables the absorbent solution to be controlled to a predetermined temperature.

The gas scrubber 140 may comprise a scrubber body 192, a third absorbent solution recovery line 149, and a gas discharge line 146. A given gas can be introduced into the scrubber body 142. The one end of the third absorbent solution recovery line 144 may be connected to the bottom of the scrubber body 192, and the other end may be connected to the top of the absorption column body 112. Thus, the third absorbent solution recovery line 144 enables the absorbent solution from the scrubber body 142 into the absorption column body 112. In addition, the gas discharge line 146 allows gas (e.g., hydrogen) in the scrubber body 142 to the outside.

Meanwhile, chemical reactions which occur in the absorption column 110 and the regeneration column 120 may be as follows:

(1)

(2)

(3)

(4)

In the above reaction equations (1), (2), (3) and (4), the forward reactions may be stripping reactions in which carbon dioxide is stripped from the absorbent solution in the regeneration column 120, and the reverse reactions may be absorption reactions in which the absorbent solution in the absorption column 110 absorbs carbon dioxide from the off-gas. Referring to reaction equation (1), the bicarbonate ion ($HCO_3^-$) can undergo a regeneration reaction in which it is decomposed into a carbonate ion ($CO_3^{2-}$), carbon dioxide ($CO_2$) and water ($H_2O$). Referring to reaction equation (2), the ammonium ion ($NH_4^+$) and the bicarbonate ion ($HCO_3^-$) can undergo a regeneration reaction in which they are decomposed into ammonia ($NH_3$), carbon dioxide ($CO_2$) and water ($H_2O$). Referring to reaction equation (3), the ammonium ion ($NH_4^+$) and the carbonate ion ($CO_3^-$) can undergo a regeneration reaction in which they are decomposed into ammonia ($NH_3$), carbon dioxide ($CO_2$) and water ($H_2O$). In addition, referring to reaction equation (4), the ammonium ion ($NH_4^+$) and the carbamate ion ($COONH_2^-$) can undergo a regeneration reaction in which they are decomposed into ammonia ($NH_3$) and carbon dioxide.

Herein, the energy required for the regeneration reaction of reaction equation 1 can be lower than the energy required for the reaction reactions of reaction equations (2), (3) and (4). Thus, in the forward reactions, the carbon dioxide ($CO_2$) stripping efficiency of the absorbent solution that is supplied to the regeneration column 120 can increase as the concentration of anions (including carbon dioxide ($CO_2$)) in the absorbent solution increases. In addition, in the reverse reactions, the efficiency of carbon dioxide from the off-gas can increase as the concentration of ammonia ($NH_3$) in the absorbent solution that is supplied to the absorption column 110 increases. Thus, the efficiency of stripping of carbon dioxide and the efficiency of regeneration of the absorbent solution can be increased by providing an ion exchange region in which the absorbent solution discharged from the absorption column 110 is ion-exchanged with the absorbent solution discharged from the regeneration column, and selectively concentrating anions (including carbon dioxide ($CO_2$)) or ions (including ammonia ($NH_3$)) in the ion exchange region.

Ion-exchange columns 200 which are described later may be embodied to the above-described principle.

Hereinafter, ion-exchange columns according to various embodiments of the present invention will be described in detail. Herein, the description of the same or similar elements or parts for the above-described apparatus for separating carbon dioxide will be omitted or simplified.

Figure 2:
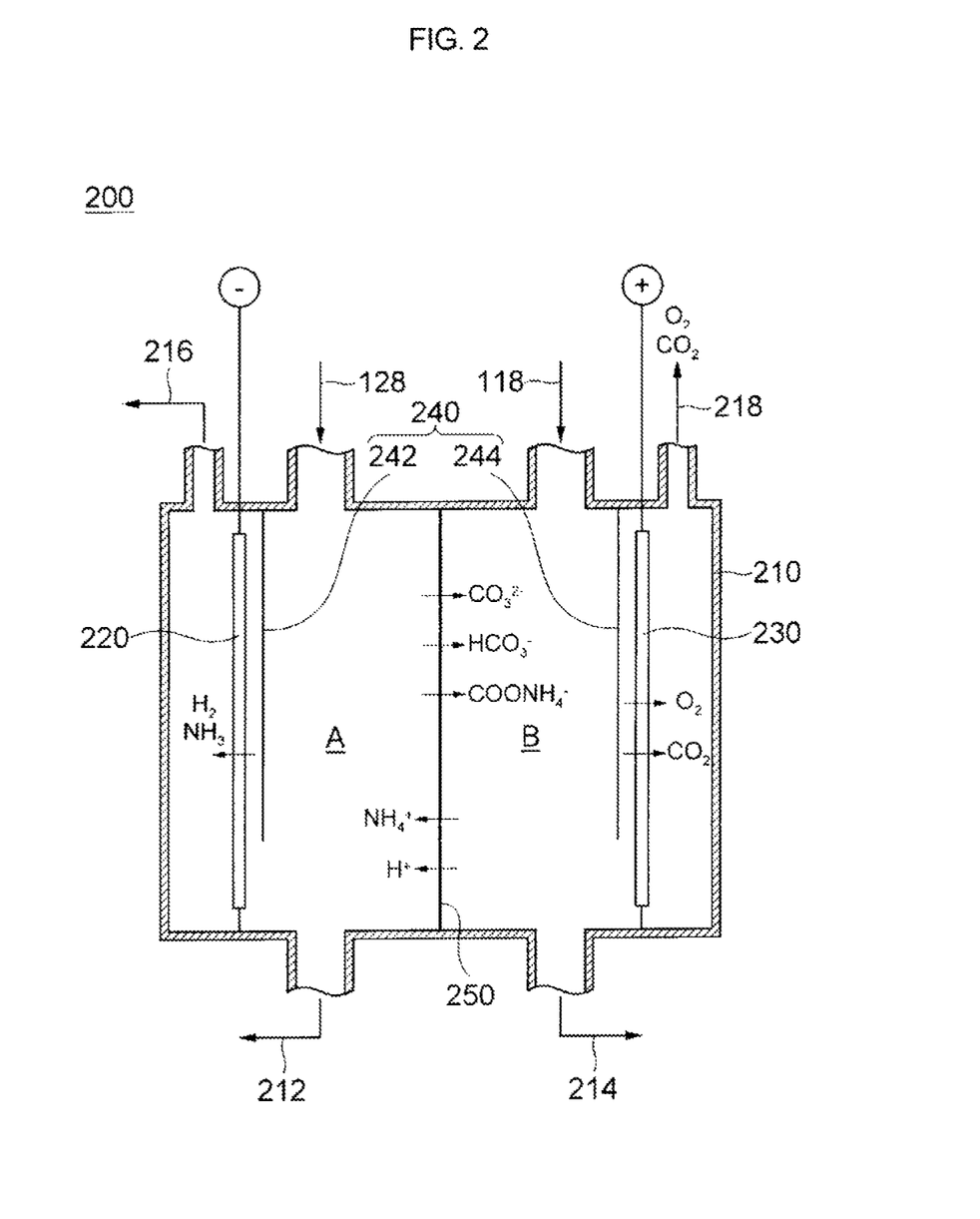
FIG. 2 illustrates a method for separating carbon dioxide according to an embodiment of the present invention.

FIG. 2 shows an ion-exchange column according to one embodiment of the present invention. Referring to FIGS. 1 and 2, an ion-exchange column 200 according to one embodiment of the present invention may comprise a chamber 210, a cathode plate 220, an anode plate 230 and a permeable membrane 250. The chamber 210 may have an internal space in which the absorbent solutions from the absorption column 110 and the regeneration column 120 are introduced and treated. The cathode plate 220 may be disposed on one sidewall of the chamber 210, and the anode plate 230 may be disposed on the other sidewall so as to face the cathode plate 220. The permeable membrane 250 may be disposed between the cathode plate 220 and the anode plate 230 so as to divide the chamber 210. Thus, the internal space of the chamber 210 can be divided by the permeable membrane 250 into a cathode chamber space A and an anode chamber space B.

The chamber 210 may comprise a first absorbent solution supply line 212, a second absorbent solution supply line 214, a gas recovery line 216 and a gas discharge line 218. One end of the first absorbent solution supply line 212 may be connected to the bottom of the chamber so as to communicate with the cathode chamber space A, and the other end may be connected to the top of the scrubber body 142. Thus, the first absorbent solution supply line 212 allows the absorbent solution in the cathode chamber space A to be supplied to the gas scrubber 140. One end of the second absorbent solution supply line 214 may be connected to the bottom of the chamber 210 so as to communicate with the anode chamber space B, and the other end may be connected to the top of the regeneration column body 122. Thus, the second absorbent solution supply line 214 allows the absorbent solution in the anode chamber space B to be supplied to the regeneration column 120. One end of the gas recovery line 216 may be connected to the top of the chamber 210 so as to communicate with the cathode chamber space A, and the other end may be connected to the bottom of the scrubber body 142. Thus, the gas recovery line 216 enables gas, which is concentrated in the upper portion of the cathode chamber space A, to be supplied to the gas scrubber 140. In addition, one end of the gas discharge line 218 may be connected to the top of the chamber 210 so as to communicate with the another chamber space B, such that gas which is concentrated in the upper portion of the anode chamber space B can be discharged to the outside. Herein, the ion-exchange column may further comprise baffles 240 which are placed in each of the cathode chamber space A and the anode chamber space B. For example, the baffles 240 may comprise a first baffle 242, which is placed in the cathode chamber space A, and a second baffle 244 which is placed in the anode chamber space B. The first baffle 242 can prevent gas in the cathode chamber space A from flowing into the second absorbent solution recovery line 128, and the second baffle 244 can prevent gas in the anode chamber space B from flowing into the first absorbent solution recovery line 118.

On the cathode plate 220, the following cathodic reactions may occur, and on the anode plate 230, the following anodic reactions may occur:

Cathodic Reactions $$H_2O \rightarrow \tfrac{1}{2}H_2\uparrow + OH^- \quad (1)$$

$$NH_4^+ \rightarrow NH_3\uparrow + H^+ \quad (2)$$

Anodic Reactions $$H_2O \rightarrow \tfrac{1}{2}O_2\uparrow + 2H^+ \quad (1)$$

$$CO_3^{2-} + H^+ \rightarrow HCO_3^- \quad (2)$$

$$HCO_3^- + H^+ \rightarrow H_2CO_3 \rightarrow H_2O + CO_2\uparrow \quad (3)$$

Referring to the above reaction equations, when sufficient voltage is applied to the cathode plate 220 and the anode plate 230, hydrogen (H) and a gaseous absorbent active material (e.g., ammonia ($NH_3$)) resulting from the loss of a hydrogen ion can be concentrated on the cathode plate 220 in the upper portion of the cathode chamber space A. Also, the hydrogen (H) and the absorbent active material, which are concentrated in the upper portion of the cathode chamber space A, can move to the gas scrubber through the gas recovery line 216. In addition, oxygen ($O_2$) and carbon dioxide ($CO_2$) are produced on the anode plate 230, and thus oxygen ($O_2$) and carbon dioxide ($CO_2$) can be concentrated in the upper portion of the anode chamber space B of the chamber 210 and can be discharged to the outside through the gas discharge line 218.

The permeable membrane 250 may serve to increase the efficiency of carbon dioxide absorption by the absorbent solution and the efficiency of regeneration of the absorption solution. For example, the permeable membrane 250 may comprise cation- and anion-permeable membranes. In this case, anions (e.g., carbonate ion ($CO_3^{2-}$), bicarbonate ion ($HCO_3^-$), carbamate ion ($COONH_2^-$, etc.) in the absorbent solution in the cathode chamber space A can pass through the permeable membrane 250 to the anode chamber space B, and cations (e.g., ammonium ion ($NH_4^+$), hydrogen ion ($H^+$), etc.) in the absorbent solution in the anode chamber solution B can pass through the permeable membrane 250 to the cathode chamber space A. Thus, in the cathode chamber space A, cations separated from the absorbent solution can be concentrated, and in the anode chamber space B, anions including carbon dioxide can be concentrated. In addition, in the upper portion of the cathode chamber space A, hydrogen ($H_2$) and a absorbent active material (e.g., ammonia ($NH_3$)) resulting from the loss of a hydrogen ion can be concentrated, and in the upper portion of the anode chamber space B, oxygen ($O_2$) and carbon dioxide ($CO_2$) can be concentrated. Thus, the hydrogen and absorbent active material in the cathode chamber space A can be supplied to the lower region of the scrubber body 142 through the first gas recovery line 216, and the oxygen and carbon dioxide in the anode chamber space B can be discharged to the outside through the gas discharge line 218. The hydrogen and absorbent active material supplied to the lower region of the scrubber body 142 are scrubbed with the absorbent solution introduced into the upper region of the scrubber body 142 while they move to the upper region of the scrubber body 142, after which they can be discharged to the outside through the gas discharge line 146. In the process in which the hydrogen and the absorbent active material are scrubbed with the absorbent solution, the concentration of the absorbent active material in the absorbent solution can be increased, and thus the efficiency of carbon dioxide absorption by the absorbent solution can be increased. The absorbent solution, the carbon dioxide absorption efficiency of which was increased in this manner, is recovered into the absorption column 110 through the third absorbent solution recovery line 144, whereby the efficiency of stripping of carbon dioxide from the off-gas can be increased.

As described above, the apparatus for separating carbon dioxide according to the present invention may comprise the ion-exchange column in which cations in the absorbent solution received from the absorption column 110 are ion-exchanged with anions in the absorbent solution received from the regeneration column 120, thereby improving the carbon dioxide stripping efficiency of the absorbent solution and the efficiency of regeneration of the absorbent solution. Thus, the apparatus and method for separating carbon dioxide according to the present invention can increase the efficiency of stripping of carbon dioxide from off-gas and the efficiency of regeneration of the absorbent solution, thereby improving the efficiency of separation of carbon dioxide from the off-gas.

The technology for separating carbon dioxide according to the present invention enables ion exchange between cations in the absorbent solution discharged from the absorption column 110 and anions in the absorbent solution discharged from the regeneration column 120, thereby reducing the concentration of carbon dioxide in the absorbent and increasing the concentration of ammonia in the absorbent solution. Thus, the apparatus and method for separating carbon dioxide according to the present invention can increase the efficiency of regeneration of the absorbent solution and reduce the energy for regeneration of the absorbent solution.

Hereinafter, modified embodiments of the above-described ion-exchange column 200 will be described in detail. Herein, the description of the same or similar elements or parts for the above-described ion-exchange column 200 will be omitted or simplified. In addition, the modified embodiments will be described later have effects and functions, which are the same as or similar to those of the above-described ion-exchange column 200, and such effects and functions can be appreciated by a person skilled in the art, and thus the detailed description thereof will be omitted.

Figure 3:
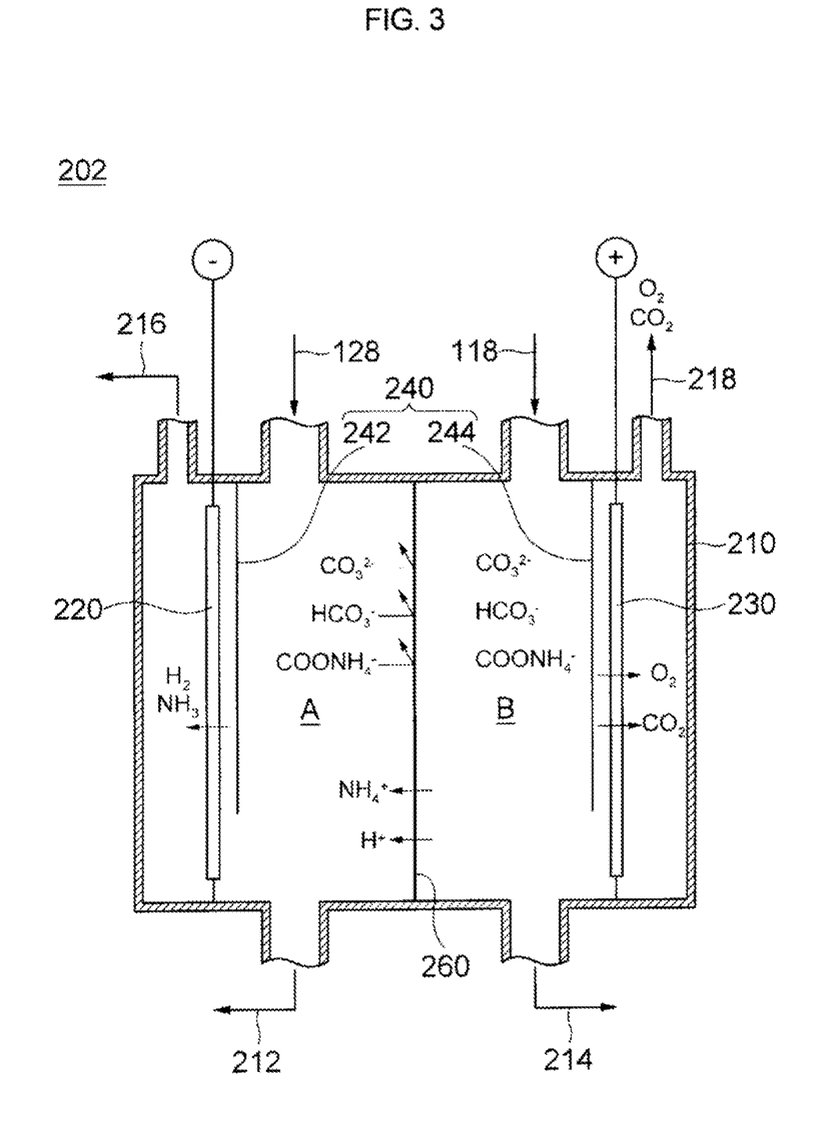
FIG. 3 shows a modified embodiment of the ion-exchange column shown in FIG. 2.

FIG. 3 shows a modified embodiment of the ion-exchange column shown in FIG. 2. Referring to FIG. 3, an ion-exchange column 202 according to a modified embodiment of the present invention may comprise a chamber 210, a cathode plate 220, an anode plate 230, baffles 240 and a permeable membrane 260. The chamber 210, the cathode plate 220, the anode plate 230 and the baffles 240 are substantially identical to the elements 210, 220, 230 and 240 of the ion-exchange column 200 described above with reference to FIG. 2, and thus the detailed description thereof will be omitted.

The permeable membrane 260 may comprise a cation-permeable membrane. For example, the permeable membrane 260 may be a membrane that selectively passes cations and selectively blocks anions. Thus, the movement of anions (e.g., carbonate ion ($CO_3^-$), bicarbonate ion ($HCO_3^-$), carbamate ion ($COONH_2^-$), etc.) in the cathode chamber space A to the anode chamber space B can be blocked, whereas cations (e.g., ammonium ion ($NH_4^+$), hydrogen ion ($H^+$), etc.) in the anode chamber space B can move to the cathode chamber space A. In this case, in the absorbent solution in the cathode chamber space A, cations can be concentrated, and in the upper region of the cathode chamber space A, hydrogen ($H_2$) and a gaseous absorbent active material (e.g., ammonia ($NH_3$) resulting from the loss of a hydrogen ion can be concentrated. The hydrogen and absorbent active material in the cathode chamber space A can be supplied to the lower region of the scrubber body 142 through the first gas recovery line 216, and the absorbent solution in the cathode chamber space A can be supplied to the upper region of the scrubber body 142 through the first absorbent solution supply line 212.

Figure 4:
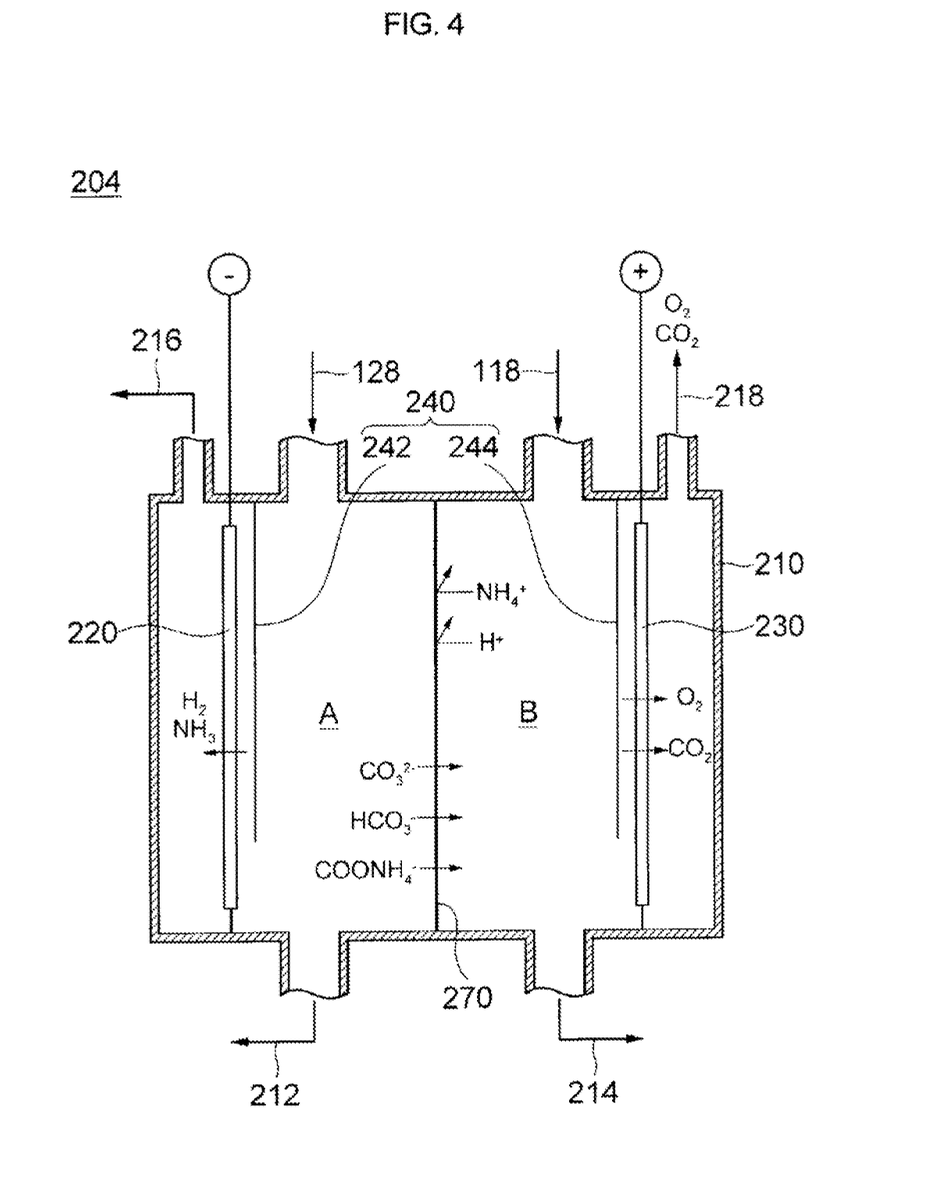
FIG. 4 shows another modified embodiment of the ion-exchange column shown in FIG. 2.

FIG. 4 shows another modified embodiment of the ion-exchange column shown in FIG. 2. Referring to FIG. 4, an ion-exchange column 204 according to another modified embodiment of the present invention may comprise a chamber 210, a cathode plate 220, an anode plate 230, baffles 240 and a permeable membrane 270. The chamber 210, the cathode plate 220, the baffles 240 and the anode plate 230 are substantially identical to the elements 210, 220, 230 and 240 of the ion-exchange column 200 described above with reference to FIG. 2, and thus the detailed description thereof will be omitted.

The permeable membrane 270 may comprise an anion-permeable membrane. For example, the permeable membrane 270 may be a membrane that selectively blocks cations and selectively passes anions. Thus, anions (e.g., carbonate ion ($CO_3^-$), bicarbonate ion ($HCO_3^-$), carbamate ion ($COONH_2^-$), etc.) in the cathode chamber space A can move to the anode chamber space B, whereas cations (e.g., ammonium ion ($NH_4^+$), the migration of hydrogen ion ($H^+$), etc.) in the absorbent solution in the anode chamber space B to the cathode chamber space A can be blocked. In this case, in the absorbent solution in the anode chamber space B, anions can be concentrated, and in the upper region of the anode chamber space B, anions including carbon dioxide can be concentrated. The carbon dioxide-containing gas in the anode chamber space B can be discharged out of the ion-exchange column 204 through the gas discharge line 218, and the absorbent solution in the anode chamber space B can be supplied to the regeneration column 120 through the second absorbent solution supply line 214.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

INDUSTRIAL APPLICABILITY

As described above, the present invention can be applied not only to a carbon dioxide separation apparatus capable of separating carbon dioxide from off-gas, but also to chemical apparatuses comprising the same.

The invention claimed is:

1. An apparatus for separating carbon dioxide, the apparatus comprising:
    an absorption column in which carbon dioxide in off-gas is allowed to react with an absorbent solution so as to strip the carbon dioxide from the off-gas;
    a regeneration column in which the carbon dioxide is removed from the absorbent solution to regenerate the absorbent solution; and
    an ion-exchange column comprising a chamber having a cathode chamber space that receives the absorbent solution from the absorption column and an anode chamber space that receives the absorbent solution from the regeneration column, the ion-exchange column further comprising a permeable membrane that divides the chamber into the cathode chamber space and the anode chamber space,
    wherein cations in the absorbent solution discharged from the absorption column are ion-exchanged with anions of the absorbent solution discharged from the regeneration column, thereby reducing the concentration of carbon dioxide in the absorbent solution and increasing the concentration of ammonia in the absorbent solution,
    wherein reducing the concentration of carbon dioxide in the absorbent solution is performed by introducing the absorbent into an anode chamber space provided with an anode plate, and moving carbon dioxide of the absorbent solution in the anode chamber space through a permeable membrane to a cathode chamber space provided with a cathode plate, and wherein increasing the concentration of ammonia in the absorbent solution is performed by introducing the absorbent solution into a cathode chamber space provided with a cathode plate, and moving ammonium ($NH_4^+$) of the absorbent solution in the cathode chamber space through a permeable membrane to an anode chamber space provided with an anode plate.

2. The apparatus of claim 1, wherein the ion-exchange column further comprises: a cathode plate disposed in the cathode chamber space; and an anode plate disposed in the anode chamber space so as to face the cathode plate.

3. The apparatus of claim 2, wherein the cathode plate and the anode plate are provided such that the following cathodic reactions and anodic reactions occur on the cathode and anode plates, respectively:

[cathodic reactions]

$$H_2O \rightarrow \tfrac{1}{2}H_2\uparrow + O^-; \text{ and}$$

$$NH_4^+ \rightarrow NH_3\uparrow + H^+;$$

[anodic reactions]

$$H_2O \rightarrow \tfrac{1}{2}O_2\uparrow + 2H^+;$$

$$CO_3^{2-} + H^+ \rightarrow HCO_3^-; \text{ and}$$

$$HCO_3^- + H^+ \rightarrow H_2CO_3^{2-} \rightarrow H_2O + CO_2\uparrow.$$

4. The apparatus of claim 1, wherein the permeable membrane comprises at least one of a bipolar membrane, an anion-permeable membrane and a cation-permeable membrane.

5. The apparatus of claim 1, wherein the apparatus further comprises a gas discharge line for discharging a gas including oxygen ($O_2$) and carbon dioxide ($CO_2$) from the anode chamber space.

6. The apparatus of claim 1, wherein the absorption column comprises a first absorbent solution recovery line which is connected to the chamber so as to pass the absorbent solution from the absorption column into the anode chamber space, and the regeneration column comprises a second absorbent solution recovery line which is connected to the chamber so as to pass the regeneration column into the cathode chamber space.

7. The apparatus of claim 6, wherein the ion-exchange column further comprises baffles which are disposed in the chamber so as to prevent gas from flowing into the first absorbent solution recovery line and the second absorbent solution recovery line.

8. The apparatus of claim 1, wherein the apparatus further comprises a gas scrubber which receives the absorbent solution and a gas from the ion-exchange column.

9. The apparatus of claim 8, wherein the gas scrubber comprises:
a scrubber body;
a third absorbent solution recovery line through which the absorbent solution is supplied from the scrubber body to the absorption column; and
a gas discharge line through which a gas in the scrubber body is discharged to an outside.

10. The apparatus of claim 8, wherein the ion-exchange column further comprises:
an absorbent solution supply line through which the absorbent solution is supplied from the chamber to the scrubber body; and
a gas recovery line through which a gas is recovered from the chamber into the scrubber body.

11. The apparatus of claim 10, wherein one end of the absorbent solution supply line is connected to the bottom of the chamber, the other end of the absorbent solution supply line is connected to the top of the scrubber body, one end of the gas recovery line is connected to the top of the chamber, and the other end of the gas recovery line is connected to the bottom of the scrubber body.

12. A method for separating carbon dioxide, the method comprising the steps of:
allowing carbon dioxide in an off-gas to react with an absorbent solution in an absorption column so as to strip the carbon dioxide from the off-gas;
removing the carbon dioxide from the absorbent solution in a regeneration column to regenerate the absorbent solution;
introducing the absorbent solution into an anode chamber space;
introducing the absorbent solution into a cathode chamber space divided from the anode chamber space by a permeable membrane; and
ion-exchanging the first absorbent solution, introduced into the anode chamber space, with the second absorbent solution introduced into the cathode chamber space, by the permeable membrane,
wherein cations in the absorbent solution discharged from the absorption column are ion-exchanged with anions of the absorbent solution discharged from the regeneration column, thereby reducing the concentration of carbon dioxide in the absorbent solution and increasing the concentration of ammonia in the absorbent solution,
wherein reducing the concentration of carbon dioxide in the absorbent solution is performed by introducing the absorbent into an anode chamber space provided with an anode plate, and moving carbon dioxide of the absorbent solution in the anode chamber space through a permeable membrane to a cathode chamber space provided with a cathode plate, and
wherein increasing the concentration of ammonia in the absorbent solution is performed by introducing the absorbent solution into a cathode chamber space provided with a cathode plate, and moving ammonium $NH_4^+$) of the absorbent solution in the cathode chamber space through a permeable membrane to an anode chamber space provided with an anode plate.

13. The method of claim 12, wherein the step of ion-exchanging the first absorbent solution with the second absorbent solution comprises at least one of a step of moving cations in the first absorbent solution to the cathode chamber space and a step of moving anions in the second absorbent solution to the anode chamber space.

14. The method of claim 12, wherein the step of ion-exchanging the first absorbent solution with the second absorbent solution is carried out through at least one of a bipolar membrane, a cation-permeable membrane and an anion-permeable membrane, which are disposed between the cathode chamber space and the anode chamber space.

15. The method of claim 12, wherein the method further comprises a step of discharging a gas containing oxygen ($O_2$) and carbon dioxide ($CO_2$) from the anode chamber space to an outside.

16. The method of claim 12, wherein the method further comprises a step of scrubbing a gas of the cathode chamber space with the absorbent solution of the cathode chamber space in an outside of the cathode chamber space.

17. The method of claim 16, wherein the step of scrubbing the gas of the cathode chamber space with the absorbent solution of the cathode chamber space in the outside of the cathode chamber space comprises the steps of:

providing a gas scrubber;
supplying the absorbent solution from the cathode chamber space to the upper portion of the gas scrubber; and
supplying the gas from the cathode chamber space to the lower portion of the gas scrubber.

18. The method of claim 17, wherein the method further comprises, after the step of scrubbing the gas of the cathode chamber space with the absorbent solution of the cathode chamber space in the outside of the cathode chamber space, a step of recovering the absorbent solution, from which the gas was scrubbed, into the absorption column.

19. The method of claim 17, wherein the method further comprises, the step of scrubbing the gas of the cathode chamber space with the absorbent solution of the cathode chamber space in the outside of the cathode chamber space, a step of discharging the gas to the outside of the gas scrubber.

20. The method of claim 17, wherein the gas contains hydrogen and an absorbent active material, in which the absorbent active material is absorbed into the absorbent solution in the step of scrubbing the gas of the cathode chamber space with the absorbent solution of the cathode chamber space in the outside of the cathode chamber space.

21. A method for separating carbon dioxide, the method comprising treating an off-gas in an absorption column in which carbon dioxide in the off-gas is allowed to react with an ammonia-containing absorbent solution so as to strip the carbon dioxide from the off-gas and in a regeneration column in which the carbon dioxide is removed from the absorbent solution to regenerate the absorbent solution,
wherein cations in the absorbent solution discharged from the absorption column are ion-exchanged with anions of the absorbent solution discharged from the regeneration column, thereby reducing the concentration of carbon dioxide in the absorbent solution and increasing the concentration of ammonia in the absorbent solution,
wherein reducing the concentration of carbon dioxide in the absorbent solution is performed by introducing the absorbent into an anode chamber space provided with an anode plate, and moving carbon dioxide of the absorbent solution in the anode chamber space through a permeable membrane to a cathode chamber space provided with a cathode plate, and
wherein increasing the concentration of ammonia in the absorbent solution is performed by introducing the absorbent solution into a cathode chamber space provided with a cathode plate, and moving ammonium ($NH_4^+$) of the absorbent solution in the cathode chamber space through a permeable membrane to an anode chamber space provided with an anode plate.

22. The method of claim 21, wherein the method further comprises scrubbing a gas of the cathode chamber space with the absorbent solution of the cathode chamber space in an outside of the cathode chamber space.

23. The method of claim 22, wherein scrubbing the gas of the cathode chamber space with the absorbent solution of the cathode chamber space in the outside of the cathode chamber space is performed by providing a gas scrubber, supplying the absorbent solution from the cathode chamber space to the top of the gas scrubber, supplying the gas from the cathode chamber space to the bottom of the gas scrubber, and recovering the absorbent, from which the gas was scrubbed, from the bottom of the gas scrubber into the absorption column.

24. The method of claim 22, wherein the gas comprises hydrogen and an absorbent active material, in which the absorbent active material is absorbed into the absorbent solution when scrubbing the gas of the cathode chamber space with the absorbent solution of the cathode chamber space in the outside of the cathode chamber space.

25. An apparatus for separating carbon dioxide, comprising:
an absorption column in which carbon dioxide in off-gas is allowed to react with an absorbent solution so as to strip the carbon dioxide from the off-gas;
a regeneration column in which the carbon dioxide is removed from the absorbent solution to regenerate the absorbent solution;
a chamber having a cathode chamber space provided with a cathode plate and an anode chamber space provided with an anode plate;
a permeable membrane disposed between the cathode plate and the anode plate so as to divide the chamber into the cathode chamber space and the anode chamber space, wherein cations in the absorbent solution discharged from the absorption column are ion-exchanged with anions of the absorbent solution discharged from the regeneration column, thereby reducing the concentration of carbon dioxide in the absorbent solution and increasing the concentration of ammonia in the absorbent solution, wherein reducing the concentration of carbon dioxide in the absorbent solution is performed by introducing the absorbent into an anode chamber space provided with an anode plate, and moving carbon dioxide of the absorbent solution in the anode chamber space through a permeable membrane to a cathode chamber space provided with a cathode plate, and wherein increasing the concentration of ammonia in the absorbent solution is performed by introducing the absorbent solution into a cathode chamber space provided with a cathode plate, and moving ammonium ($NH_4^+$) of the absorbent solution in the cathode chamber space through a permeable membrane to an anode chamber space provided with an anode plate; and
a gas scrubber which receives a gas from the chamber and scrubs the gas.

26. The apparatus of claim 25, wherein the gas contains hydrogen and an absorbent active material.

27. The apparatus of claim 25, wherein the gas scrubber comprises;
a scrubber body;
a third absorbent solution recovery line through which an absorbent solution is supplied from the scrubber body to an absorption column; and
a gas discharge line through which a gas in the scrubber body is discharged to an outside.

28. The apparatus of claim 27, wherein the apparatus further comprises: an absorbent solution supply line through which the absorbent solution is supplied from the chamber to the scrubber body; and a gas recovery line through which a gas is recovered from the chamber into the scrubber body.

29. The apparatus of claim 27, wherein one end of the absorbent solution supply line is connected to the bottom of the chamber, the other end of the absorbent solution supply line is connected to the top of the scrubber body, one end of the gas recovery line is connected to the top of the chamber, and the other end of the gas recovery line is connected to the bottom of the scrubber body.

30. The apparatus of claim 25, wherein the permeable membrane comprises any one of a bipolar membrane, an anion-permeable membrane and a cation-permeable membrane.

31. The apparatus of claim 25, wherein the cathode plate and the anode plate are provided such that the following cathodic reactions and anodic reactions occur on the cathode and anode plates, respectively:

[cathodic reactions]

$$H_2O \rightarrow \tfrac{1}{2}H_2\uparrow + O^-; \text{ and}$$

$$NH_4^+ \rightarrow NH_3\uparrow + H^+;$$

[anodic reactions]

$$H_2O \rightarrow \tfrac{1}{2}O_2\uparrow + 2H^+;$$

$$CO_3^{2-} + H^+ \rightarrow HCO_3^-; \text{ and}$$

$$HCO_3^- + H^+ \rightarrow H_2CO_3^{2-} \rightarrow H_2O + CO_2\uparrow.$$

32. The apparatus of claim 25, wherein the apparatus further comprises a gas discharge line through which a gas containing oxygen ($O_2$) and carbon dioxide is discharged from the anode chamber space.

33. The apparatus of claim 25, wherein the apparatus further comprises baffles which are disposed in the chamber so as to prevent a gas from flowing into the first absorbent solution recovery line and the second absorbent solution recovery line.

* * * * *